US011572837B2

(12) United States Patent
Alecu et al.

(10) Patent No.: US 11,572,837 B2
(45) Date of Patent: Feb. 7, 2023

(54) BUFFER FLUID DELIVERY SYSTEM AND METHOD FOR A SHAFT SEAL OF A GAS TURBINE ENGINE

(71) Applicant: PRATT & WHITNEY CANADA CORP., Longueuil (CA)

(72) Inventors: Daniel Alecu, Brampton (CA); David Menheere, Norval (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 87 days.

(21) Appl. No.: 17/155,500

(22) Filed: Jan. 22, 2021

(65) Prior Publication Data

US 2022/0235709 A1    Jul. 28, 2022

(51) Int. Cl.
*F02C 7/28*    (2006.01)
*F01D 9/06*    (2006.01)
(Continued)

(52) U.S. Cl.
CPC ............... *F02C 7/28* (2013.01); *F01D 9/065* (2013.01); *F01D 25/125* (2013.01); *F01D 25/183* (2013.01); *F02C 6/08* (2013.01); *F02C 7/18* (2013.01); *F02C 3/04* (2013.01); *F02C 7/06* (2013.01); *F02C 9/16* (2013.01); *F05D 2220/32* (2013.01); *F05D 2240/35* (2013.01);
(Continued)

(58) Field of Classification Search
CPC ...... F02C 7/28; F02C 6/08; F02C 7/18; F02C 3/04; F02C 7/06; F02C 9/16; F01D 9/065; F01D 25/125; F01D 25/183; F01D 25/186; F05D 2220/32; F05D 2240/35; F05D 2240/55; F05D 2240/60; F05D 2260/221
See application file for complete search history.

(56) References Cited

U.S. PATENT DOCUMENTS 3,844,110 A * 10/1974 Widlansky ............ F01D 25/125
417/372
9,097,138 B2   8/2015 Glahn et al.
(Continued)

FOREIGN PATENT DOCUMENTS

EP    1795710 A2   6/2007
EP    3680454 A1   7/2020
(Continued)

OTHER PUBLICATIONS

European Patent Office, Communication re. extended European search report for European patent application No. 22152826.8 dated Jun. 24, 2022.

*Primary Examiner* — Todd E Manahan
*Assistant Examiner* — Rene D Ford
(74) *Attorney, Agent, or Firm* — Norton Rose Fulbright Canada LLP

(57) ABSTRACT

Systems and methods for delivering a buffer fluid to a shaft seal of a gas turbine engine are provided. An exemplary system includes, a buffer fluid source, one or more first conduits providing fluid communication between the buffer fluid source and the shaft seal along a first route, and one or more second conduits providing fluid communication between the buffer fluid source and the shaft seal along a second route different from the first route. A heat exchanger is also disposed along the first route to facilitate heat transfer between buffer fluid in the one or more first conduits and a cooling fluid.

16 Claims, 6 Drawing Sheets

FORWARD ←→ AFT

(51) Int. Cl.
  *F01D 25/12* (2006.01)
  *F01D 25/18* (2006.01)
  *F02C 6/08* (2006.01)
  *F02C 7/18* (2006.01)
  *F02C 3/04* (2006.01)
  *F02C 7/06* (2006.01)
  *F02C 9/16* (2006.01)

(52) U.S. Cl.
  CPC ...... *F05D 2240/55* (2013.01); *F05D 2240/60* (2013.01); *F05D 2260/221* (2013.01)

(56) References Cited

U.S. PATENT DOCUMENTS

| | | | | |
|---|---|---|---|---|
| 10,018,116 B2* | 7/2018 | Ackermann | ............... | F02C 6/08 |
| 2001/0047651 A1* | 12/2001 | Fukutani | ............... | F01D 25/125 |
| | | | | 60/785 |
| 2005/0132706 A1* | 6/2005 | Fukutani | ................ | F02C 7/28 |
| | | | | 60/726 |
| 2006/0213202 A1* | 9/2006 | Fukutani | .................. | F02C 6/08 |
| | | | | 60/785 |
| 2006/0267290 A1* | 11/2006 | Spencer | ................ | F01D 25/183 |
| | | | | 277/348 |
| 2011/0203293 A1* | 8/2011 | Glahn | ...................... | F02C 7/32 |
| | | | | 60/785 |
| 2012/0156005 A1 | 6/2012 | Nielsen et al. | | |
| 2013/0192238 A1* | 8/2013 | Munsell | ................... | F02C 6/08 |
| | | | | 60/785 |
| 2013/0192250 A1* | 8/2013 | Glahn | ....................... | F02C 6/08 |
| | | | | 60/785 |
| 2013/0192251 A1* | 8/2013 | Munsell | .................. | F02C 9/18 |
| | | | | 60/785 |
| 2013/0223985 A1* | 8/2013 | Hashimoto | ............ | F01D 9/065 |
| | | | | 415/111 |
| 2014/0144121 A1 | 5/2014 | Legare et al. | | |
| 2014/0144154 A1* | 5/2014 | Legare | ................... | F01D 25/16 |
| | | | | 60/785 |
| 2016/0265432 A1* | 9/2016 | Huppe | ...................... | F02C 6/08 |
| 2017/0107854 A1* | 4/2017 | Friedl | ....................... | F02K 1/805 |
| 2018/0223690 A1* | 8/2018 | Ullah | ...................... | F16C 33/72 |
| 2018/0291816 A1* | 10/2018 | Parnin | ...................... | F16J 15/44 |

FOREIGN PATENT DOCUMENTS

| | | |
|---|---|---|
| JP | 2013024079 A | 2/2013 |
| WO | 2014066815 A1 | 5/2014 |

* cited by examiner

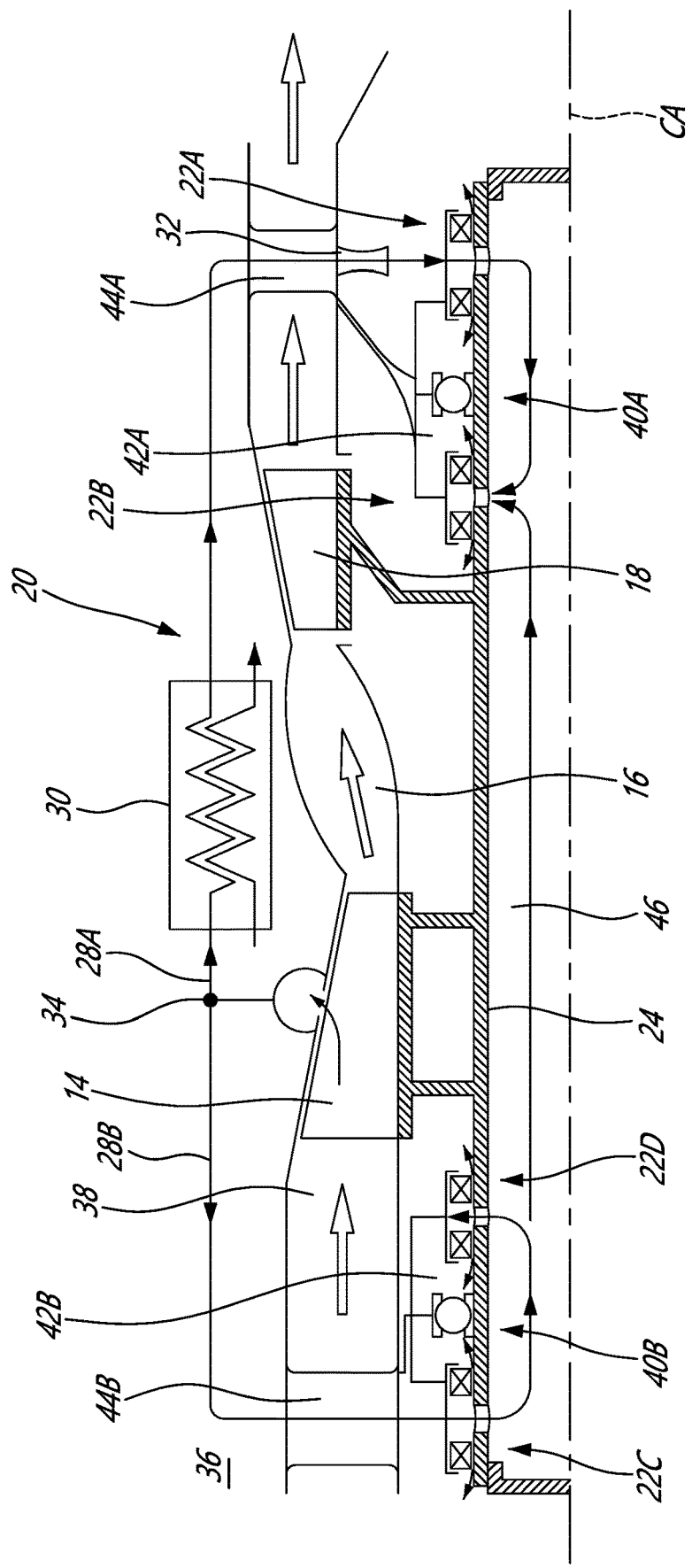

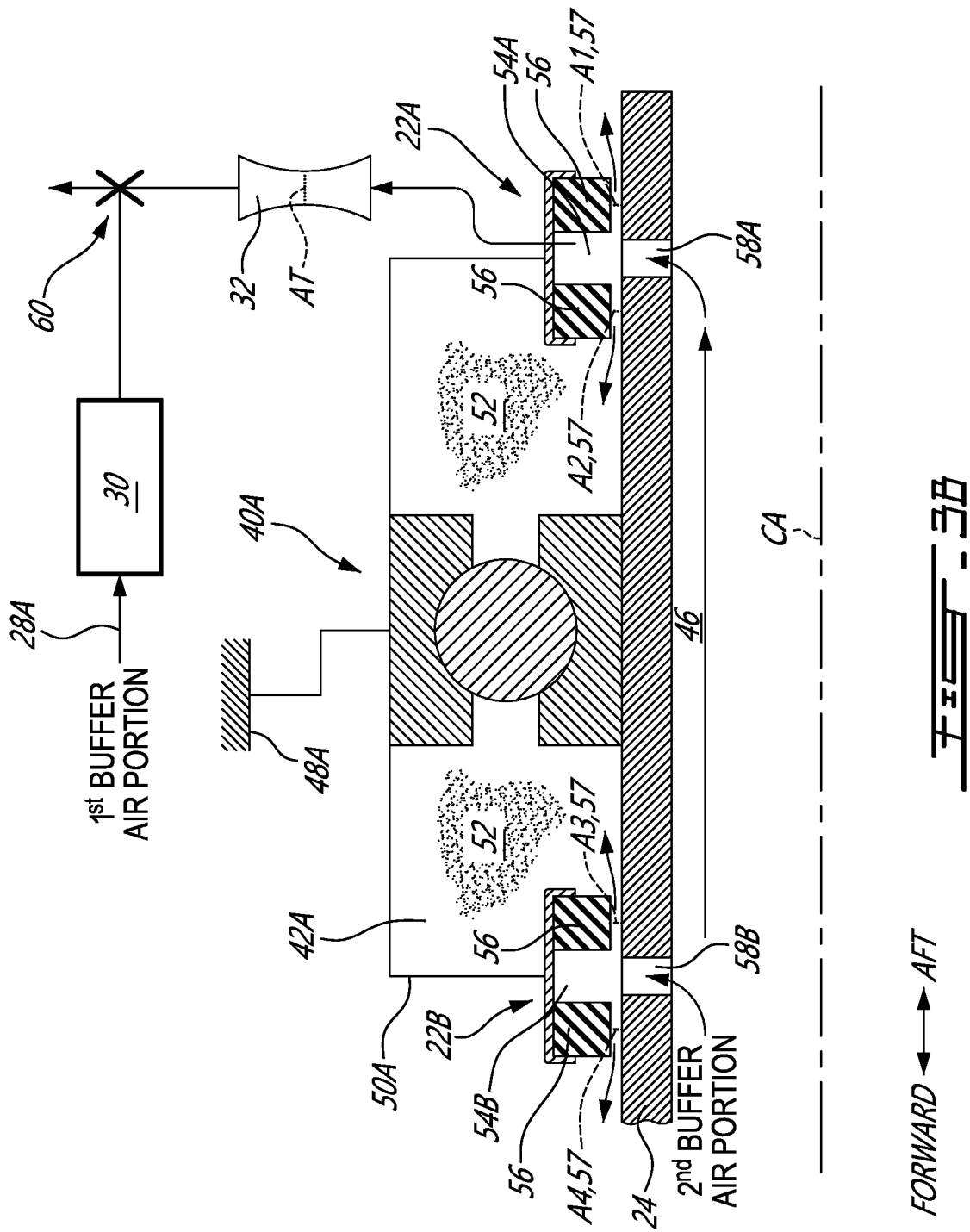

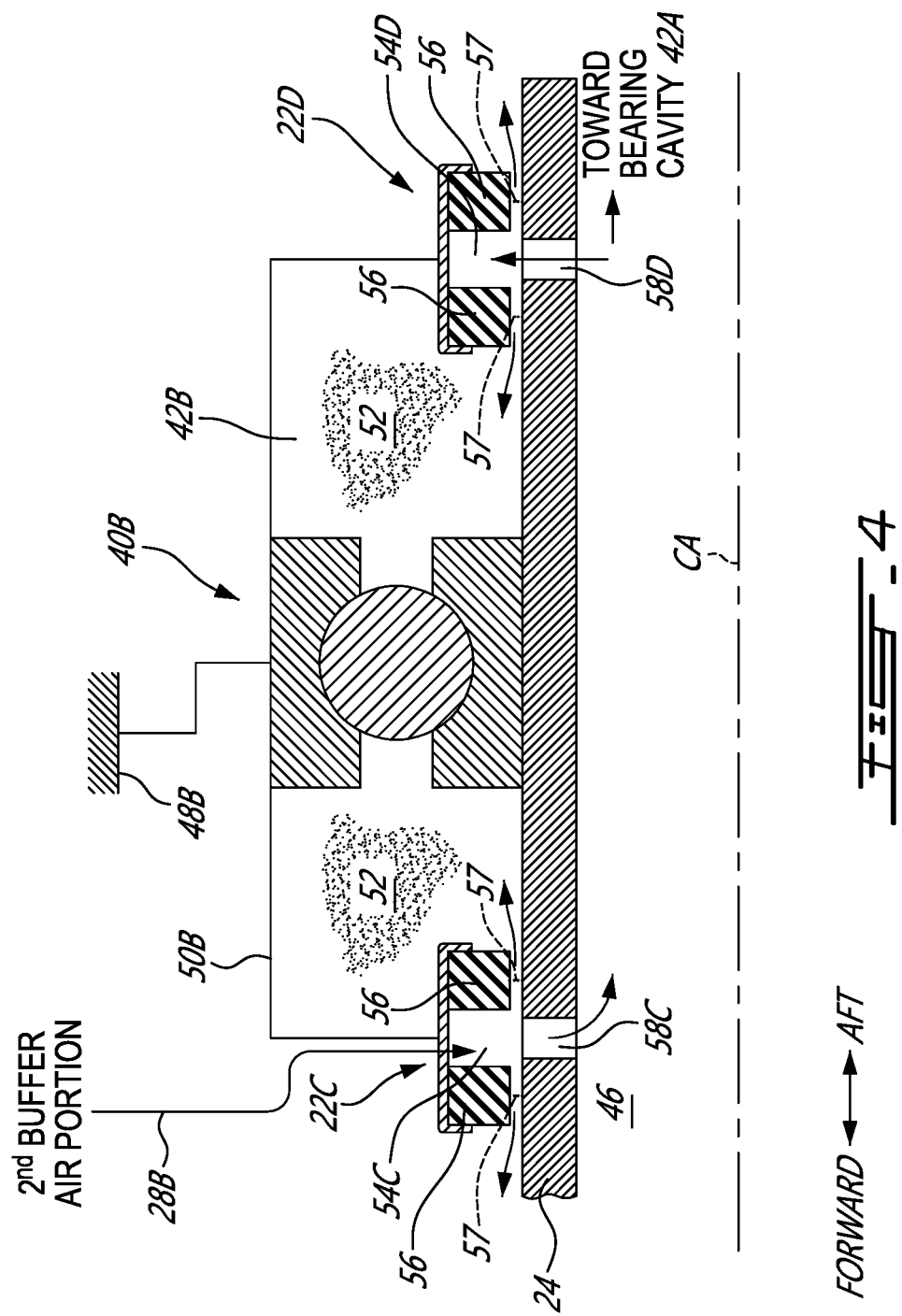

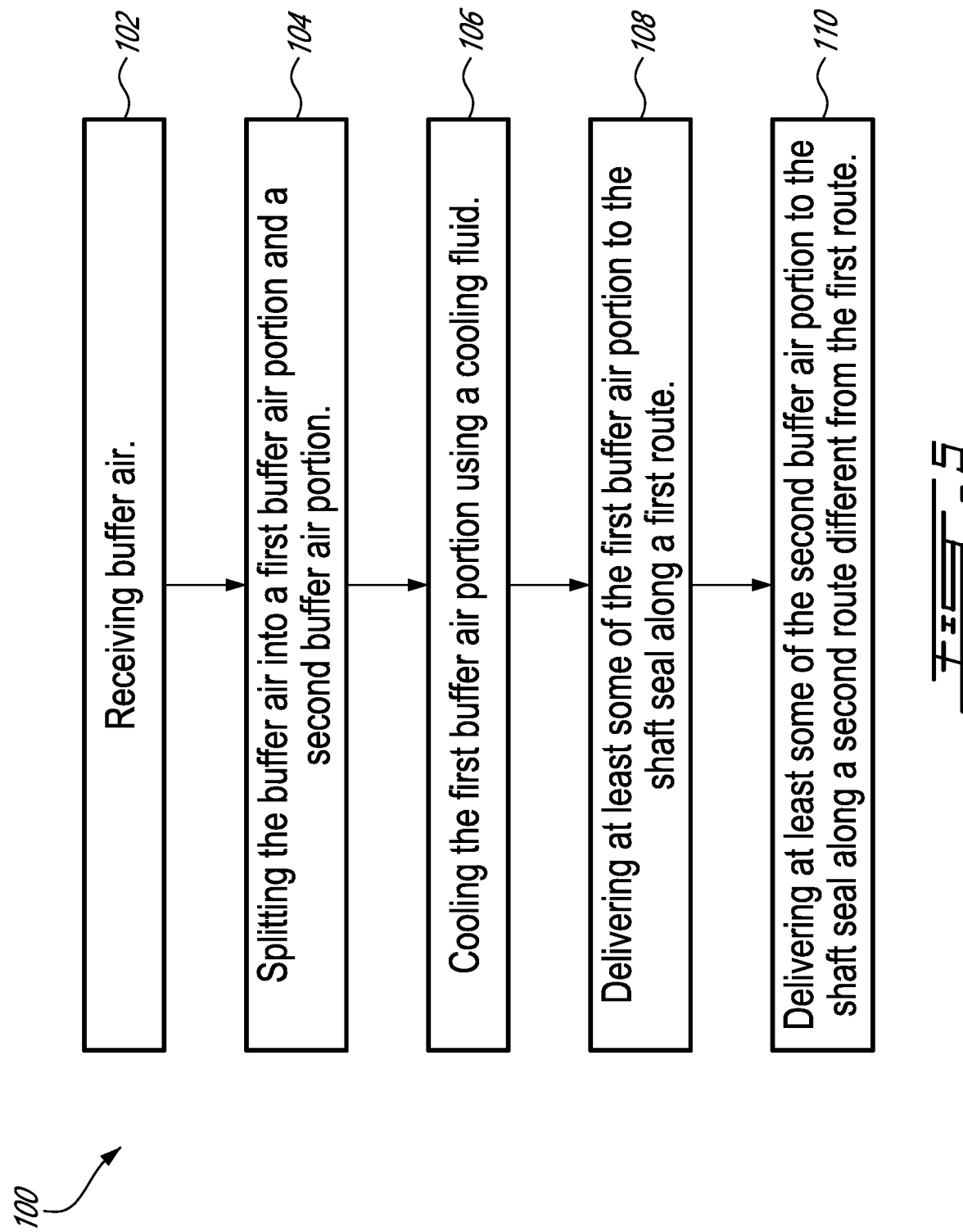

BUFFER FLUID DELIVERY SYSTEM AND METHOD FOR A SHAFT SEAL OF A GAS TURBINE ENGINE

TECHNICAL FIELD

The disclosure relates generally to gas turbine engines, and more particularly to shaft seals of gas turbine engines.

BACKGROUND

Some of the pressurized air generated by a compressor of a gas turbine engine may be extracted before the combustion process and used to service pneumatic loads. Such pneumatic loads may, for example, include buffered shaft seals (e.g., labyrinth seals) of the gas turbine engine that require buffer air to prevent leakage of oil therethrough. The pressurized air extracted from the compressor can be an energy draw from the gas turbine engine. A labyrinth seal can provide a non-contact sealing interface between a stator and a rotor and some labyrinth seals can withstand high-temperature conditions exhibited in parts of the gas turbine engine. However, labyrinth seals can require a significant amount of pressurized buffer air during operation, which can contribute to the overall fuel consumption of the gas turbine engine. Improvement is desirable.

SUMMARY

In one aspect, the disclosure describes a buffer fluid delivery system for a shaft seal of a gas turbine engine. The system comprises:
- a buffer fluid source;
- one or more first conduits providing fluid communication between the buffer fluid source and the shaft seal along a first route;
- a heat exchanger disposed along the first route to facilitate heat transfer between buffer fluid in the one or more first conduits and a cooling fluid; and
- one or more second conduits providing fluid communication between the buffer fluid source and the shaft seal along a second route different from the first route.

In another aspect, the disclosure describes a gas turbine engine comprising:
- a compressor for generating pressurized air;
- a combustor in which the pressurized air is mixed with fuel and ignited for generating a stream of combustion gas;
- a turbine section for extracting energy from the combustion gas;
- a shaft seal disposed in the turbine section;
- one or more first conduits providing fluid communication between the compressor and the shaft seal along a first route;
- a heat exchanger operatively disposed along the first route to facilitate heat transfer between the pressurized air in the one or more first conduits and a cooling fluid; and
- one or more second conduits providing fluid communication between the compressor and the shaft seal along a second route different from the first route.

In a further aspect, the disclosure describes a method for delivering buffer air to a shaft seal of a gas turbine engine. The method comprises:
- receiving the buffer air;
- splitting the buffer air into a first buffer air portion and a second buffer air portion;
- using a heat exchanger, cooling the first buffer air portion by facilitating heat transfer from the first buffer air portion to a cooling fluid;
- delivering at least some of the first buffer air portion to the shaft seal via a first route; and
- delivering at least some of the second buffer air portion to the shaft seal via a second route different from the first route.

Further details of these and other aspects of the subject matter of this application will be apparent from the detailed description included below and the drawings.

DESCRIPTION OF THE DRAWINGS

Reference is now made to the accompanying drawings, in which:

FIG. 2 shows a schematic enlarged axial cross-section view of part of a turbofan gas turbine engine including the buffer air delivery system of FIG. 1;

FIGS. 3A and 3B show a schematic axial cross-section view of an exemplary aft bearing cavity of the gas turbine engine of FIG. 1 under different respective operating conditions;

FIG. 4 shows a schematic axial cross-section view of an exemplary forward bearing cavity of the gas turbine engine of FIG. 1; and FIG. 5 show a flow diagram of a method for delivering buffer air to a shaft seal of a gas turbine engine.

DETAILED DESCRIPTION

The following disclosure describes systems and methods for delivering buffer fluid to one or more shaft seals of a gas turbine engine. The systems and methods described herein may be used with various types of known or other buffered shaft seals. However, in some embodiments, the systems and methods may allow for the use of less fluid-consuming shaft seals at locations in gas turbine engines where labyrinth seals have traditionally been used due to relatively high temperatures. For example, in some embodiments, the systems and methods may cool the buffer fluid prior to delivery to the less fluid-consuming shaft seal(s) to provide additional cooling capacity and allow the less fluid-consuming shaft seal(s) to be installed in a higher-temperature environment. In some embodiments, the systems and methods may, instead or in addition, allow for the supply the buffer fluid to the same shaft seal(s) via different routes to provide redundancy in the supply of buffer fluid. In some situations, the use of less air-consuming shaft seals at locations where labyrinth seals have traditionally been used may promote a reduced overall consumption of bleed air extracted from a compressor of the gas turbine engine and consequently promote a reduced fuel consumption of the gas turbine engine.

Aspects of various embodiments are described through reference to the drawings.

The term "connected" or "coupled" may include both direct connection or coupling where two elements contact each other, and indirect connection or coupling where at least one additional element is located between the two elements.

The term "substantially" as used herein may be applied to modify any quantitative representation which could permissibly vary without resulting in a change in the basic function to which it is related.

Figure 1:
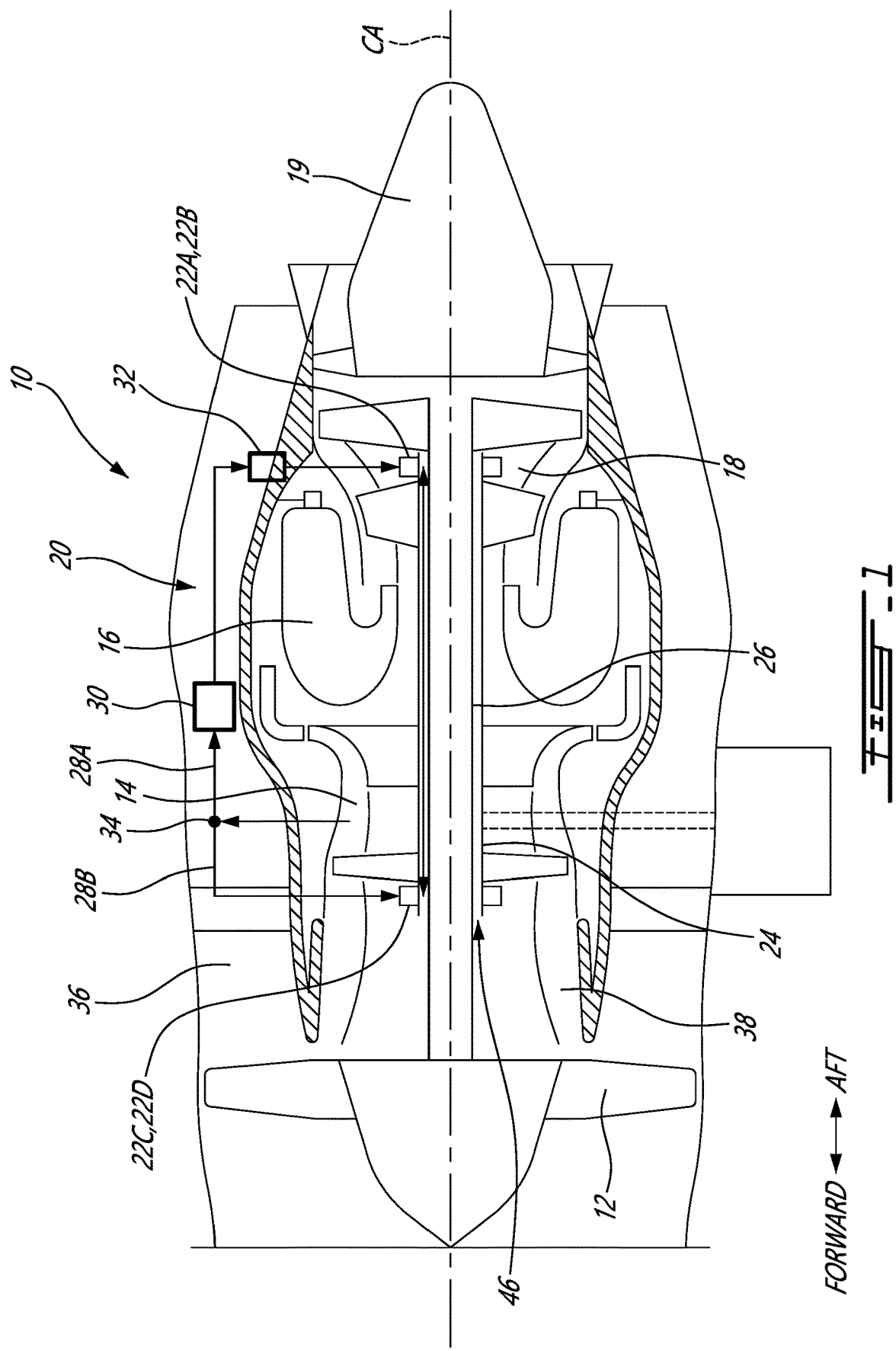
FIG. 1 shows a schematic axial cross-section view of a turbofan gas turbine engine including an exemplary buffer air delivery system as disclosed herein.

FIG. 1 illustrates a gas turbine engine 10 (referred hereinafter as "engine 10") of a type preferably provided for use in subsonic flight, generally comprising in serial flow communication, a fan 12 through which ambient air is propelled, a multistage compressor section 14 for pressurizing the air, a combustor 16 in which the compressed air is mixed with fuel and ignited for generating an annular stream of hot combustion gases, and a turbine section 18 for extracting energy from the combustion gases. Engine 10 may be suitable for use in aircraft applications. For example, engine 10 may be a turbofan, turboprop or turboshaft type of engine. Engine 10 may also include turbine exhaust cone 19.

Engine 10 may include buffer fluid delivery system 20 (referred hereinafter as "system 20") for supplying buffer fluid (e.g., pressurized air) to one or more shaft seals 22A-22D of engine 10. Shaft seals 22A-22D may be associated with a same shaft of engine 10 such as high-pressure (HP) shaft 24 or low-pressure (LP) shaft 26 for example. Alternatively, some of shaft seals 22A-22D may be associated with different shafts of engine 10. HP shaft 24 may interconnect one or more high-pressure turbines with one or more compressor stages of compressor section 14. LP shaft 26 may interconnect one or more low-pressure turbines with fan 12. HP shaft 24 and LP shaft 26 may be coaxial and may be rotatable about a common axis identified as central axis CA in FIG. 1 for example. Central axis CA may also correspond to a rotation axis of fan 12. HP shaft 24 may have hollow interior 46. LP shaft 26 may be disposed inside of hollow interior 46 of HP shaft 24 and may extend through HP shaft 24. HP shaft 24 and LP shaft 26 may be drivingly uncoupled so that they may be separately rotatable.

HP shaft 24 and/or LP shaft 26 may penetrate one or more walls (e.g., stator, housing) defining a boundary between a first cavity and a second (e.g., oil containing) cavity such as a gear box or a bearing cavity for example. Shaft seals 22A-22D may provide suitable sealing between the rotating HP shaft 24 or LP shaft 26 and such a wall.

System 20 may include a source of buffer fluid which may be pressurized air such as bleed air extracted from compressor section 14 for example. However, it is understood that other types and sources of fluids could be suitable for use as buffer fluid in some embodiments. The extracted pressurised air may be extracted at one or more suitable locations along compressor section 14 so that pressurised air at the desired pressure may be obtained and used as buffer air for one or more of shaft seals 22A-22D.

System 20 may include two or more branches 28A, 28B via which the buffer air may be delivered to one or more shaft seals 22A-22D. First branch 28A may include heat exchanger 30 operatively disposed therein for facilitating cooling of the buffer air in first branch 28A prior to delivery of the buffer air to one or more of shaft seals 22A-22D via first branch 28A. First branch 28A may also include convergent-divergent nozzle 32 (e.g., choked Venturi) operatively disposed therein for regulating a flow of the buffer air in first branch 28A. First branch 28A and second branch 28B may each comprise one or more conduits such as pipes, tubes, ducts, channels and/or other passages for conveying the buffer air. Once extracted from compressor section 14, the flow of buffer air may be split into a first buffer air portion delivered to first branch 28A of system 20 and a second buffer air portion delivered to second branch 28B of system 20. The flow of buffer air may be split at flow splitter 34, which may be a tee pipe fitting for example.

FIG. 2 shows an enlarged schematic axial cross-section view of part of engine 10 including system 20. In some embodiments, engine 10 may be a turbofan engine including bypass duct 36 defining a passage for bypass air propelled by fan 12, and core duct 38 defining a core gas path including compressor section 14, combustor 16 and turbine section 18. HP shaft 24 may be rotatably supported in engine 10 via one or more bearings such as forward bearing 40B and aft bearing 40A that are disposed at different axial locations along HP shaft 24. Forward bearing 40B may be disposed inside forward bearing cavity 42B that is supplied with oil for lubricating and cooling forward bearing 40B. Aft bearing 40A may be disposed inside aft bearing cavity 42A that is supplied with oil for lubricating and cooling aft bearing 40A. Forward bearing cavity 42B may be disposed axially between and defined at least in part by shaft seals 22C, 22D providing sealing interfaces with HP shaft 24. Aft bearing cavity 42A may be disposed axially between and defined at least in part by shaft seals 22A, 22B also providing sealing interfaces with HP shaft 24. FORWARD and AFT directions are indicated in FIG. 2 where the FORWARD direction corresponds generally to a direction of motion of the illustrated turbofan engine 10 when mounted to an aircraft.

Forward bearing 40B and associated shaft seals 22C, 22D may be axially disposed in or adjacent compressor section 14 of engine 10. For example, forward bearing 40B and associated shaft seals 22C, 22D may be axially coincident with part of core duct 38 upstream of combustor 16 of engine 10. Aft bearing 40A and associated shaft seals 22A, 22B may be axially disposed in or adjacent turbine section 18 of engine 10. For example, aft bearing 40A and associated shaft seals 22A, 22B may be axially coincident with part of core duct 38 downstream of combustor 16 of engine 10. Accordingly, forward bearing 40B and associated shaft seals 22C, 22D may be disposed in a relatively lower-temperature environment, and aft bearing 40A and associated shaft seals 22A, 22B may be disposed in a relatively higher-temperature environment.

Heat exchanger 30 may be operatively disposed within first branch 28A to facilitate cooling of the first portion of buffer air flowing toward shaft seal(s) 22A, 22B. Heat exchanger 30 may be of any suitable type facilitating heat transfer between the buffer air and any suitable cooling fluid. In some embodiments, heat exchanger 30 may be an air-to-air heat exchanger where the cooling fluid includes bypass air flowing in bypass duct 36. In some embodiments, heat exchanger 30 may be an air-to-liquid heat exchanger where the cooling fluid is oil from a lubricating system of engine 10, or fuel. Non-limiting examples of suitable types of heat exchanger 30 may include a parallel-flow heat exchanger, a counter-flow heat exchanger, a shell-and-tube heat exchanger, a finned or unfinned tubular heat exchanger, and a plate-fin heat exchanger.

Convergent-divergent nozzle 32 may be operatively disposed within first branch 28A to regulate a flow of buffer air through first branch 28A and also regulate a flow of buffer air to shaft seal(s) 22A, 22B. Convergent-divergent nozzle 32 may be disposed downstream of heat exchanger 30 and upstream of shaft seal(s) 22A, 22B relative to a streamwise direction of the flow of buffer air in first branch 28A. In some embodiments, a calibrated orifice providing a flow constriction may be used instead of or in addition to convergent-divergent nozzle 32. However, the use of convergent-divergent nozzle 32 may, in some embodiments, provide a desired flow regulation behavior with relatively low pressure losses. Such convergent-divergent nozzle 32 may define a flow constriction that includes an upstream tapering portion, a throat, and a downstream expanding portion in relation to the streamwise direction of the flow of buffer air through first branch 28A. As explained further below, the flow constriction provided by convergent-divergent nozzle 32 may have a cross-sectional area that is sized based on expected flow and cooling requirements of shaft seal(s) 22A, 22B during operation of engine 10.

First branch 28A may be routed across core duct 38 though aft strut 44A disposed downstream of combustor 16. First branch 28A may deliver buffer air to shaft seals 22A, 22B in a serial manner. For example, buffer air from first branch 28A may be first delivered to shaft seal 22A and then subsequently delivered to shaft seal 22B via hollow interior 46 of HP shaft 24 as illustrated using arrows in FIG. 2.

Second branch 28B may be routed across core duct 38 through forward strut 44B disposed upstream of combustor 16. Second branch 28B may deliver buffer air to shaft seals 22C, 22D in a serial manner. For example, buffer air from second branch 28B may be first delivered to shaft seal 22C and then subsequently delivered to shaft seal 22D via hollow interior 46 of HP shaft 24 as illustrated using arrows in FIG. 2. Hollow interior 46 of HP shaft 24 may also provide fluid communication between aft shaft seals 22A, 22B and forward shaft seals 22C, 22D. Accordingly, second branch 28B may include hollow interior 46 of HP shaft 24 and provide an alternate and redundant route for providing buffer air to aft shaft seals 22A, 22B. In other words, first and second branches 28A, 28B may both or separately and independently supply buffer air to aft shaft seals 22A, 22B disposed in the hotter region of engine 10 via different routes (i.e., courses, paths or ways).

In the event where less air-consuming and more temperature-sensitive seals are used as aft shaft seals 22A, 22B, the use of both branches 28A, 28B to deliver buffer air to aft shaft seals 22A, 22B may provide redundancy in providing the required buffer air and cooling capacity to aft shaft seals 22A, 22B. In addition, hollow interior 46 of HP shaft 24 may serve as a mixing chamber for buffer air from both branches 28A, 28B and may provide cooling for segments of HP shaft 24 carrying radially-inner races of bearings 40A and 40B. The mixing of buffer air from both branches 28A, 28B in hollow interior 46 of HP shaft 24 may also provide pressure balancing of the buffer air used in aft shaft seals 22A, 22B and forward shaft seals 22C, 22D. The mixing of buffer air from both branches 28A, 28B in hollow interior 46 of HP shaft 24 may also allow for the first buffer air portion to cool the second buffer air portion.

Figure 3A:
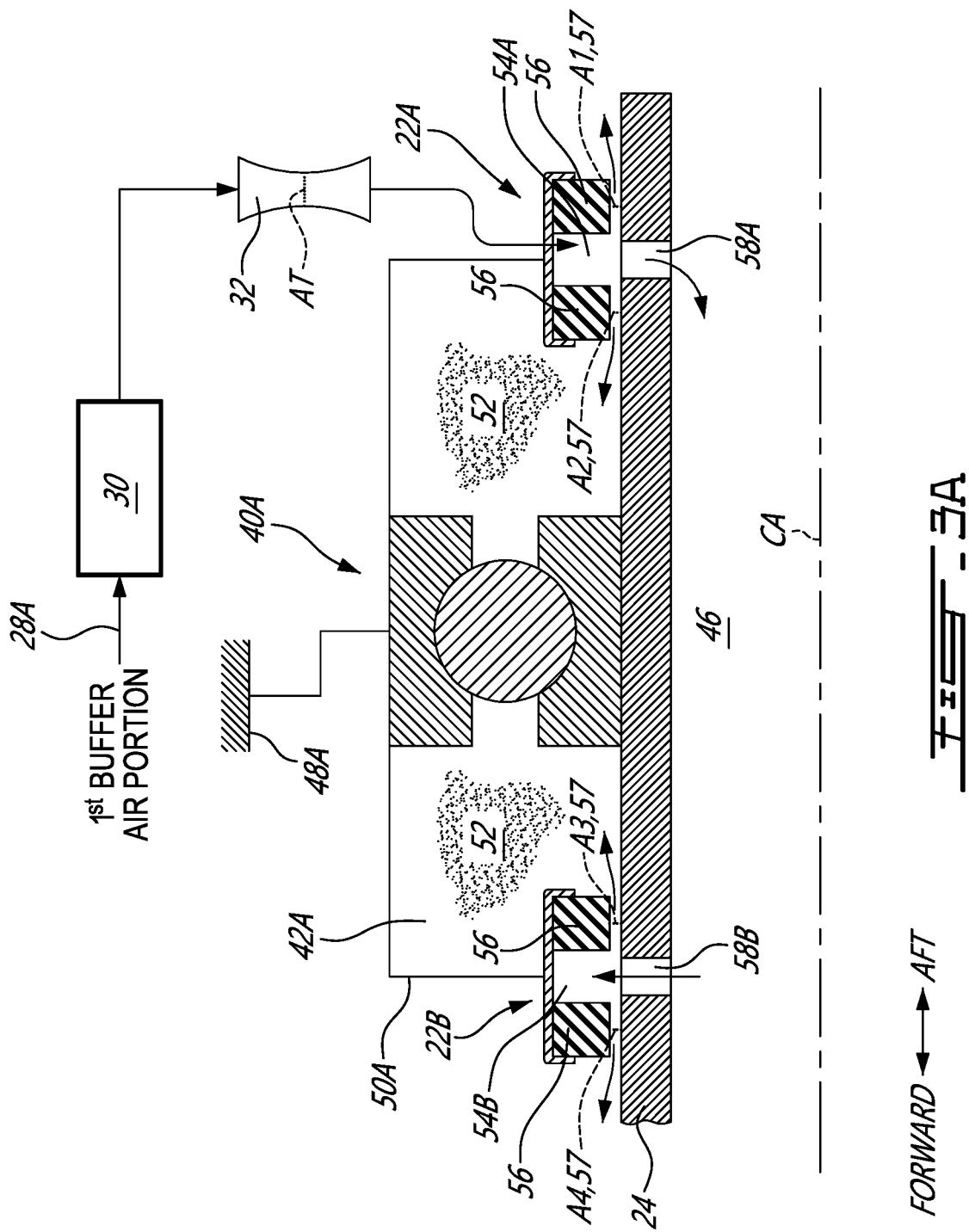

FIGS. 3A and 3B show an enlarged schematic axial cross-section view of an exemplary aft bearing cavity 42A of engine 10 under different respective operating conditions. In reference to FIG. 3A, bearing 40A may rotatably support an aft part of HP shaft 24 relative to stator 48A which may include any suitable structure that is structurally connected to a casing of engine 10 for example. Bearing cavity 42A may be defined by housing 50A and may be supplied with oil 52 for lubricating and cooling bearing 40A. Bearing cavity 42A may be part of a lubrication system of engine 10 where oil 52 is circulated by being supplied to bearing 40A and retrieved from bearing cavity 42A during operation of engine 10.

Bearing cavity 42A may also be defined by shaft seals 22A and 22B which serve to substantially prevent oil 52 from leaking out of bearing cavity 42A. Shaft seals 22A and 22B may be axially spaced apart along central axis CA and bearing 40A may be disposed axially between both shaft seals 22A, 22B.

Shaft seals 22A, 22B may each be buffered seals where a buffer fluid such as pressurized air is fed radially into seal chambers 54A, 54B between respective pairs of sealing members 56. As shown in FIG. 3A, the buffer air then flows in opposite directions where the first direction is toward the interior of bearing cavity 42A and the second direction is toward the exterior of bearing cavity 42A. In operation, there may be a pressure differential across sealing members 56 with the pressure of the buffer air being greater than the pressure inside bearing cavity 42A. This pressure differential may prevents oil leakage from bearing cavity 42A out of shaft seals 22A, 22B.

In some embodiments, one or more of sealing members 56 may include a labyrinth seal. However, in some embodiments the cooling of the buffer air in first branch 28A, and optionally the redundancy in buffer air supply provided by second branch 28B, may allow for one or more less fluid-consuming sealing members 56 to be used in aft shaft seals 22A, 22B instead of labyrinth seals. For example, sealing members 56 may include (e.g., carbon) contact seals or non-contact seals. Sealing members 56 may be annular (i.e., ring-shaped) and extend around HP shaft 24. Sealing members 56 may be made from two or more segments each extending partially around HP shaft 24 and that are assembled together.

In some embodiments, sealing members 56 may be made from a carbon-based material such as graphite and may be self-lubricating. The graphite may optionally be impregnated with inorganic chemicals to improve its lubricating qualities and oxidation resistance. Carbon-based materials may provide a relative low coefficient of friction, low wear rate at high sliding speed, high thermal conductivity, and resistance to oxidation in high-temperature air.

In some embodiments, sealing members 56 may include one or more (e.g., carbon) controlled-gap seals including a carbon sealing ring with a steel retaining ring shrink fitted on the outside diameter, two steel mating rings, a spacer ring, and an outer shell. In operation, the pressure differential induced using the buffer air may prevents oil leakage and also hold the carbon sealing ring against the oil side mating ring while HP shaft 24 turns freely within the carbon sealing ring.

In some embodiments, sealing members 56 may include one or more carbon ring seals constructed from three or more carbon ring segments bound together and held against HP shaft 24 by a retaining garter spring. The carbon ring segments may be prevented from rotating by a tang. In some embodiments, one or more sealing members 56 may be of the floating type that can follow some radial motion of HP shaft 24.

FIG. 3A shows shaft seals 56 as (e.g., carbon) controlled-gap seals as a non-limiting example. Shaft seal 22A may include two sealing members 56 that, in cooperation with HP shaft 24, define respective two outlet passages 57 (i.e., gaps defined between sealing members 56 and HP shaft 24) for releasing buffer air supplied to seal chamber 54A of shaft seal 22A. A first outlet passage 57 may provide fluid communication between seal chamber 54A and the exterior of bearing cavity 42A. The first outlet passage 57 may be substantially annular and may have a cross-sectional area A1 in a plane that is normal to central axis CA. The first outlet passage 57 of shaft seal 22A may permit buffer air to be released into turbine exhaust cone 19 (shown in FIG. 1) of engine 10 and provide cooling to the space inside of turbine exhaust cone 19.

A second outlet passage 57 may provide fluid communication between seal chamber 54A and the interior of bearing cavity 42A. The second outlet passage 57 may be substantially annular and may have a cross-sectional area A2 in a plane that is normal to central axis CA. The first and second outlet passages 57 of shaft seal 22A may have a combined cross-sectional area that equals the sum of cross-sectional areas A1 and A2 (i.e., A1+A2).

Shaft seal 22B may also include two sealing members 56 that, in cooperation with HP shaft 24, define respective two outlet passages 57 for releasing buffer air supplied to seal chamber 54B of shaft seal 22B. A first outlet passage 57 may provide fluid communication between seal chamber 54A and the interior of bearing cavity 42A. The first outlet passage 57 may be substantially annular and may have a cross-sectional area A3 in a plane that is normal to central axis CA. A second outlet passage 57 may provide fluid communication between seal chamber 54B and the exterior of bearing cavity 42B. The second outlet passage 57 may be substantially annular and may have a cross-sectional area A4 in a plane that is normal to central axis CA. The first and second outlet passages 57 of shaft seal 22B may have a combined cross-sectional area that equals the sum of cross-sectional areas A3 and A4 (i.e., A3+A4).

During operation, the first buffer air portion flowing in first branch 28A may be cooled using heat exchanger 30 and may then flow through convergent-divergent nozzle 32 before being delivered to seal chamber 54A. Some of the buffer air may exit seal chamber 54A though the outlet passages 57 having cross-sectional areas A1 and A2. Some of the buffer air may also exit seal chamber 54A and enter hollow interior 46 of HP shaft 24 via one or more through holes 58A formed in HP shaft 24. Inside of hollow interior 46, some of the first buffer air portion delivered via first branch 28A may mix with some of the second buffer air portion delivered via second branch 28B. The buffer air inside of hollow interior 46 of HP shaft 24 may then be delivered to seal chamber 54B of shaft seal 22B via one or more through holes 58B formed in HP shaft 24. The buffer air entering seal chamber 54B may then exit seal chamber 54B though the outlet passages 57 having cross-sectional areas A3 and A4.

The throat of convergent-divergent nozzle 32 may be sized to regulate the flow of buffer air to shaft seals 22A, 22B based on the expected consumption of buffer air by both shaft seals 22A, 22B at the end of their useful life. Accordingly, cross-sectional area AT of the throat of convergent-divergent nozzle 32 may be sized based on the combined cross-sectional areas of shaft seals 22A, 22B. For example, cross-sectional area AT of the throat of convergent-divergent nozzle 32 may be sized to be equal to or greater than a sum of cross-sectional areas A1, A2, A3, A4 associated with the outlet passages 57 of shaft seals 22A, 22B so that AT≥A1+A2+A3+A4. In some embodiments, cross-sectional area AT of the throat of convergent-divergent nozzle 32 may be sized to be 10% to 20% greater than the sum of cross-sectional areas A1, A2, A3, A4 associated with the outlet passages 57 of shaft seals 22A, 22B.

FIG. 3B shows an enlarged schematic axial cross-section view of the same exemplary aft bearing cavity 42A as shown in FIG. 3A but under a different operating condition than that shown in FIG. 3A. FIG. 3B illustrates a scenario where a failure 60 has caused the supply of the first buffer air portion to shaft seals 22A, 22B via first branch 28A to cease. In this situation, the redundancy in buffer air supply provided by second branch 28B may allow shaft seals 22A, 22B to still be supplied with buffer air. Accordingly, hollow interior 46 of HP shaft 24 may be part of second branch 28B conveying some of the second buffer air portion to shaft seals 22A, 22B. Even though the cooling capacity provided by heat exchanger 30 may not be available in this scenario, the buffer air supplied via second branch 28B may still be adequate to allow shaft seals 22A, 22B to operate to a level acceptable to permit the operation of engine 10 at a reduced power output level and/or temporarily until the aircraft to which engine 10 is mounted may safely land.

In the scenario illustrated in FIG. 3B, convergent-divergent nozzle 32 may still provide some regulation of the buffer air flow supplied to shaft seals 22A and/or 22B. For example, some of the buffer air supplied to shaft seal 22A may flow into first branch 28A and into convergent-divergent nozzle 32 in the reverse direction.

FIG. 4 shows an enlarged schematic axial cross-section view of an exemplary forward bearing cavity 42B of engine 10. Forward bearing cavity 42B may have a same or different configuration as aft bearing cavity 42A described above. Shaft seals 22C, 22D may be of the same or of a different type as shaft seals 22A, 22B described above. Like elements are identified using like reference numerals. Bearing 40B may rotatably support a forward part of HP shaft 24 relative to stator 48B. Bearing cavity 42B may be defined by housing 50B, which may be supplied with oil 52 for lubricating and cooling bearing 40B. Bearing cavity 42B may also be defined by buffered shaft seals 22C and 22D which serve to substantially prevent oil 52 from leaking out of bearing cavity 42B. Shaft seals 22C and 22D may be axially spaced apart along central axis CA and bearing 40B may be disposed axially between shaft seals 22C, 22D. In some embodiments, shaft seals 22C, 22D may be controlled-gap carbon seals or other types of seals.

During operation, the second buffer air portion flowing in second branch 28B may be delivered to seal chamber 54C. Some of the buffer air may exit seal chamber 54C though outlet passages 57 defined between sealing members 56 of shaft seal 22C and HP shaft 24. Some of the buffer air may also exit seal chamber 54C and enter hollow interior 46 of HP shaft 24 via one or more through holes 58C formed in HP shaft 24. Inside of hollow interior 46, some of the first buffer air portion delivered via first branch 28A may mix with some of the second buffer air portion delivered via second branch 28B. The buffer air inside of hollow interior 46 of HP shaft 24 may then be delivered to seal chamber 54D of shaft seal 22D via one or more through holes 58D formed in HP shaft 24. The buffer air entering seal chamber 54D may then exit seal chamber 54D though outlet passages 57 defined between sealing members 56 of shaft seal 22D and HP shaft 24.

In some embodiments, the second buffer air portion delivered via second branch 28B may be in fluid communication with shaft seals 22A, 22B (shown in FIGS. 3A and 3B) via shaft seal 22C and hollow interior 46 of HP shaft 24.

FIG. 5 shows a flow diagram of an exemplary method 100 for delivering buffer air to one or more shaft seals 22A-22D of engine 10 or of other types of gas turbine engine. Aspects of method 100 may be combined with aspects of system 20 or with other steps or actions described herein. In various embodiments, method 100 may include:

receiving the buffer air (block 102);

splitting the buffer air into a first buffer air portion and a second buffer air portion (block 104);

using heat exchanger 30, cooling the first buffer air portion by facilitating heat transfer from the first buffer air portion to a cooling fluid (block 106);

delivering at least some of the first buffer air portion to the shaft seal (e.g., shaft seals 22A, 22B) via a first route (block 108); and delivering at least some of the second buffer air portion to the shaft seal (e.g., shaft seals 22A, 22B) via a second route different from the first route (block 110).

In some embodiments, method 100 may comprise:

regulating a flow of the first buffer air portion to shaft seal (e.g., shaft seals 22A, 22B) using convergent-divergent nozzle 32 operatively disposed along the first route;

ceasing to deliver the first buffer air portion to the shaft seal (e.g., shaft seals 22A, 22B) via the first route (e.g., see failure 60 in FIG. 3B); and regulating a flow of the second buffer air portion to the shaft seal (e.g., shaft seals 22A, 22B) via the second route using the convergent-divergent nozzle 32 operatively disposed along the first route.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

What is claimed is:

1. A buffer fluid delivery system for a shaft seal of a gas turbine engine, the system comprising:
   a buffer fluid source;
   one or more first conduits providing fluid communication between the buffer fluid source and the shaft seal along a first route;
   a heat exchanger disposed along the first route to facilitate heat transfer between buffer fluid in the one or more first conduits and a cooling fluid; and
   one or more second conduits providing fluid communication between the buffer fluid source and the shaft seal along a second route different from the first route,
   wherein:
      the shaft seal is a first shaft seal associated with a first bearing cavity; and
      the second route includes a second shaft seal associated with a second bearing cavity of the gas turbine engine.

2. The system as defined in claim 1, wherein:
   the first and second shaft seals are associated with a same rotatable shaft;
   the first shaft seal is disposed in a turbine section of the gas turbine engine; and
   the second shaft seal is disposed in a compressor section of the gas turbine engine.

3. The system as defined in claim 2, wherein the second route includes a hollow interior of the rotatable shaft.

4. The system as defined in claim 2, wherein the first shaft seal includes one or more controlled-gap carbon sealing members.

5. The system as defined in claim 1, wherein the first route includes a convergent-divergent nozzle for regulating a flow of the buffer fluid to the shaft seal.

6. The system as defined in claim 5, wherein:
   the system includes a second third shaft seal associated with the first bearing cavity, the one or more first conduits providing fluid communication between the buffer fluid source and the third shaft seal along the first route, the one or more second conduits providing fluid communication between the buffer fluid source and the third shaft seal along the second route;
   the first shaft seal having sealing members defining first outlet passages for releasing buffer fluid supplied to the first shaft seal, the first outlet passages having a combined first cross-sectional area;
   the third shaft seal having sealing members defining second outlet passages for releasing buffer fluid supplied to the third shaft seal, the second outlet passages having a combined second cross-sectional area; and
   the convergent-divergent nozzle has a throat cross-sectional area that is greater than a sum of the first and second cross-sectional areas.

7. The system as defined in claim 6, wherein the throat cross-sectional area is between 10% and 20% greater than the sum of the first and second cross-sectional areas.

8. The system as defined in claim 6, wherein the third shaft seal is in fluid communication with the buffer fluid source via a hollow interior of a rotatable shaft.

9. The system as defined in claim 1, wherein:
   the first and second shaft seals are associated with a same rotatable shaft; and
   the first and second shaft seals are in fluid communication with each other via a hollow interior of the rotatable shaft.

10. The system as defined in claim 9, wherein the first route includes a convergent-divergent nozzle for regulating a flow of the buffer fluid to the first shaft seal.

11. A gas turbine engine comprising:
   a compressor for generating pressurized air;
   a combustor in which the pressurized air is mixed with fuel and ignited for generating a stream of combustion gas;
   a turbine section for extracting energy from the combustion gas;
   a shaft seal disposed in the turbine section;
   one or more first conduits providing fluid communication between the compressor and the shaft seal along a first route;
   a heat exchanger operatively disposed along the first route to facilitate heat transfer between the pressurized air in the one or more first conduits and a cooling fluid; and
   one or more second conduits providing fluid communication between the compressor and the shaft seal along a second route different from the first route,
   wherein:
      the shaft seal includes one or more controlled-gap carbon sealing members;
      the shaft seal is a first shaft seal;
      the second route includes a second shaft seal;
      the first and second shaft seals are associated with a same rotatable shaft having a hollow interior;
      the first and second shaft seals are associated with different bearing cavities; and
      the first and second shaft seals are in fluid communication with each other via the hollow interior of the rotatable shaft.

12. The gas turbine engine as defined in claim 11, wherein the first route includes a convergent-divergent nozzle for regulating a flow of the pressurized air to the first shaft seal.

13. A method for delivering buffer air to a shaft seal of a gas turbine engine, the method comprising:
   receiving the buffer air;
   splitting the buffer air into a first buffer air portion and a second buffer air portion;
   using a heat exchanger, cooling the first buffer air portion by facilitating heat transfer from the first buffer air portion to a cooling fluid;
   delivering at least some of the first buffer air portion to the shaft seal via a first route; and
   delivering at least some of the second buffer air portion to the shaft seal via a second route different from the first route, wherein:
the shaft seal is disposed in a turbine section of the gas turbine engine;
the shaft seal includes one or more controlled-gap carbon sealing members;
the shaft seal is a first shaft seal;
the second route includes a second shaft seal;
the first and second shaft seals are associated with a same rotatable shaft having a hollow interior; and
the second route includes the hollow interior of the rotatable shaft.

14. The method as defined in claim 13, comprising:
regulating a flow of the first buffer air portion to the shaft seal using a convergent-divergent nozzle operatively disposed along the first route;
ceasing to deliver the first buffer air portion to the shaft seal via the first route; and
regulating a flow of the second buffer air portion to the shaft seal via the second route using the convergent-divergent nozzle operatively disposed along the first route.

15. A buffer fluid delivery system for a shaft seal of a gas turbine engine, the system comprising:
a buffer fluid source;
one or more first conduits providing fluid communication between the buffer fluid source and the shaft seal along a first route;
a heat exchanger disposed along the first route to facilitate heat transfer between buffer fluid in the one or more first conduits and a cooling fluid; and
one or more second conduits providing fluid communication between the buffer fluid source and the shaft seal along a second route different from the first route,
wherein:
the first route includes a convergent-divergent nozzle for regulating a flow of the buffer fluid to the shaft seal;
the shaft seal is a first shaft seal associated with a bearing cavity;
the system includes a second shaft seal associated with the bearing cavity, the one or more first conduits providing fluid communication between the buffer fluid source and the second shaft seal along the first route, the one or more second conduits providing fluid communication between the buffer fluid source and the second shaft seal along the second route;
the first shaft seal having sealing members defining first outlet passages for releasing buffer fluid supplied to the first shaft seal, the first outlet passages having a combined first cross-sectional area;
the second shaft seal having sealing members defining second outlet passages for releasing buffer fluid supplied to the second shaft seal, the second outlet passages having a combined second cross-sectional area; and
the convergent-divergent nozzle has a throat cross-sectional area that is greater than a sum of the first and second cross-sectional areas.

16. A method for delivering buffer air to a shaft seal of a gas turbine engine, the method comprising:
receiving the buffer air;
splitting the buffer air into a first buffer air portion and a second buffer air portion;
using a heat exchanger, cooling the first buffer air portion by facilitating heat transfer from the first buffer air portion to a cooling fluid;
delivering at least some of the first buffer air portion to the shaft seal via a first route;
delivering at least some of the second buffer air portion to the shaft seal via a second route different from the first route;
regulating a flow of the first buffer air portion to the shaft seal using a convergent-divergent nozzle operatively disposed along the first route;
ceasing to deliver the first buffer air portion to the shaft seal via the first route; and
regulating a flow of the second buffer air portion to the shaft seal via the second route using the convergent-divergent nozzle operatively disposed along the first route.

* * * * *